Jan. 2, 1951 L. M. KAY 2,536,132
APPARATUS FOR CANCELING STRAY FIELD EFFECTS IN MAGNETIC RECORDERS
Filed March 25, 1948
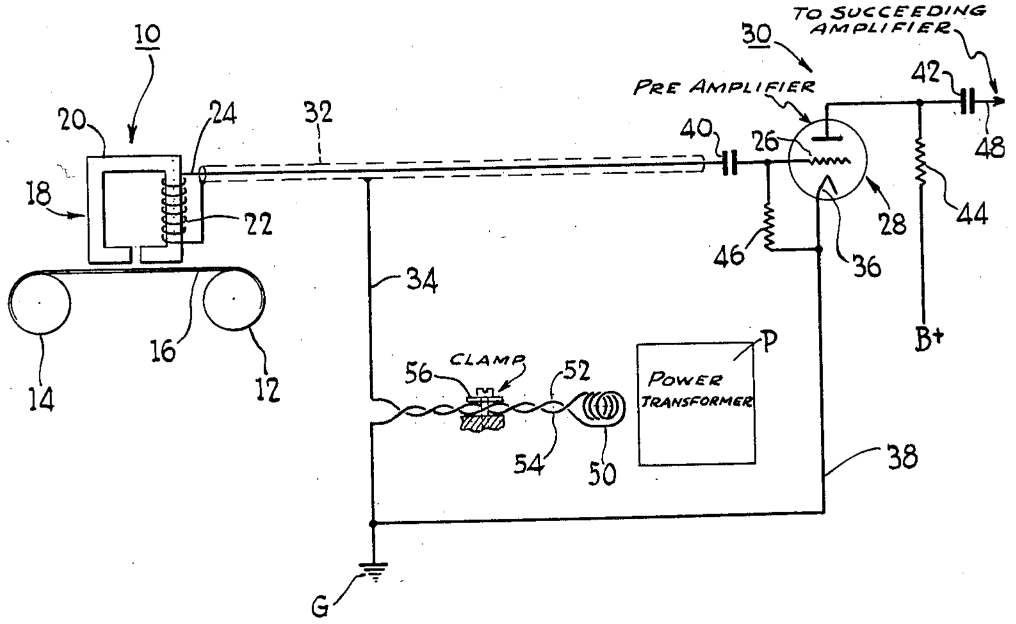
INVENTOR.
LEOPOLD M. KAY
BY
[signature]
ATTORNEY Patented Jan. 2, 1951 2,536,132

UNITED STATES PATENT OFFICE 2,536,132

APPARATUS FOR CANCELING STRAY FIELD EFFECTS IN MAGNETIC RECORDERS

Leopold M. Kay, New York, N. Y., assignor to Air King Products Co., Inc., Brooklyn, N. Y., a corporation of New York Application March 25, 1948, Serial No. 16,995

1 Claim. (Cl. 179—100.2)

This invention relates to the cancellation of stray field effects. More particularly, the invention is concerned with the elimination from an electric wave reproducing system of distorting frequencies generated in the system by stray electro-magnetic fields such, for instance, as those radiated by A. C. power transformers, filters, smoothing chokes and motor windings.

Even more specifically, the invention pertains to the reduction or elimination of stray frequencies arising from single sources which radiate stray low frequency electro-magnetic fields and to the elimination of specific combinations of such stray interferences.

By way of example, my invention will be described herein with respect to the elimination of hum in wire playback devices. However, it is to be understood that this specific form of my invention is to be considered as illustrative, and my invention is not to be deemed as limited thereby except to the extent to which features of such embodiment are pointed out hereinafter and are incorporated in the appended claim.

Wave reproduction in an electric system will be distorted when a component of said system sensitive to electro-magnetic fields, e. g. a coil, is located within the range of influence of a stray electro-magnetic field. The high impedance reproducing coil of a wire playback device is such an electro-magnetically sensitive component. If this coil, as usually is the case, is physically near the A. C. power transformer of the system, it will pick up an A. C. voltage whose presence in the audibly reproduced wave will give rise to an A. C. hum.

Heretofore, it has been the practice to eliminate such hub by employing a high impedance hum-bucking coil, essentially identical electrically and physically with the reproducing coil. This coil was placed physically immediately adjacent the reproducing coil so that it would be subject to the same stray fields. The hum-bucking coil was so oriented by physical adjustment with respect to the reproducing coil and external interfering fields, that the voltage generated in the hum-bucking coil and in the reproducing coil by these fields was substantially the same. The two coils were electrically connected in series opposition so that said distorting voltages effectively were cancelled.

With such an arrangement either the hum-bucking coil or the reproducing coil was located at a high potential to ground in comparison with the amplifier so that the reproducing equipment was extremely sensitive to electro-static pickup, making it very difficult to adjust, and required the extensive use of shielding. Furthermore, a hum-bucking coil of this type was comparatively expensive and bulky. Because of the large number of turns of fine wire in the hum-bucking coil, the coil was subject to mechanical defects. Moreover, the hum-bucking coil was out in the open where it frequently would be approached by hand and cause hum, and where its addition to already built, i. e., existing equipment not specially designed for it, was impractical. Furthermore, it has been found in the use of such a coil that the same only cancels out hum from one or very few major sources. The difficulty of adjusting the coil to cancel out all sources of hum has proved to be insurmountable.

It is an object of my invention to provide a method and means for cancelling the effect of stray electro-magnetic fields, which can be used in conjunction with any existing equipment, can cancel as many sources of hum as is desired, and raises no installation problems.

It is another object of my invention to provide a means of the character described which is inexpensive to make and apply to electric wave reproducing systems either in the factory or in the field, and which is near ground potential so that it is easy to adjust by hand.

It is a further object of my invention to provide a means of the character described which inherently is concealed within the housing for the system and thus is impervious to hand effects.

It is an additional object of my invention to provide a means of the character described which is simple and rugged, and whose principal component is a coil of comparatively few turns of heavy wire, so that it is not subject to mechanical defects.

It is yet another object of my invention to provide a means of the character described which does not require the use of shielding leads, which has a substantial degree of tolerance in positioning, and which is comparatively insensitive to moisture and humidity effects.

Other objects of my invention will in part be obvious and will in part be pointed out hereinafter.

My invention accordingly consists in the features of construction, combinations of elements and arrangements of parts which will be exemplified in the construction hereinafter described and of which the scope of application will be indicated in the appended claim.

In the accompanying drawing in which is shown one of the various possible embodiments of my invention, the single figure schematically indicates the portion of a wire reproducing circuit in which my invention is incorporated.

In general I achieve the several objects of my invention by placing a low impedance distortion cancelling coil of comparatively few turns in the immediate vicinity of a specific component which radiates a stray low frequency electro-magnetic field whose effect is to be eliminated. The output of this coil is fed into the wave reproducing system at any point after the electro-magnetically sensitive component. Preferably, the output of said coil is introduced into the system right after said component, for instance, excellent results are secured when said cancelling coil is connected in series with and electrically juxtaposed to the electro-magnetically sensitive component. Desirably, the cancelling coil is located on the side of the electro-magnetically sensitive component which is closest to ground potential so that said coil will not be "hot," i. e. at a high potential and it may be approached by hand for purposes of adjustment.

The cancelling coil is physically manipulated to vary the strength and phase of its output in such fashion that it substantially will buck in amplitude and phase, the amplitude and phase of the distorting voltage generated in the electro-magnetically sensitive component.

Referring now in detail to the drawing, the reference numeral 10 denotes the pickup equipment of a wire reproducer. This equipment includes a supply spool 12 and a takeup spool 14 adapted to run a magnetized wire 16 at a constant speed past a conventional pickup head 18. Said head includes an iron core 20 whose air gap is adjacent the path of the wire, and a reproducing coil 22 which governs the wave forms reproduced. This coil has a high impedance and comprises a very large number of turns of fine wire as is well known in the art. Said coil is extremely sensitive to electro-magnetic fields.

Conventionally, the reproducing coil is connected to the input of the amplifier stages, it being understood that if a pre-amplifier is employed, as ordinarily is done with a wire pickup for impedance matching, the pre-amplifier is considered as the first stage in the amplifier. Due to the high impedance of the reproducing coil, the leads connecting the coil to the pre-amplifier are shielded.

More specifically, one end of the reproducing coil 22 is connected by a lead wire 24 to the grid 26 of the vacuum tube 28 comprising the pre-amplifier stage 30. This lead 28 is provided with a shield 32 to which the other end of the reproducing coil 22 is connected. The shield runs to ground G through a lead wire 34. The cathode 36 of the tube 28 is connected to ground through a lead 28 so that the second terminal of the reproducing coil is connected to the cathode at ground potential. The pre-amplifier stage is of conventional design and includes the usual blocking condensers 40, 42, plate load resistor 44 and grid load resistor 46. The output of the pre-amplifier stage is conducted by a lead wire 48 to the succeeding amplifier stage.

Pursuant to my invention, I provide a low impedance hum-bucking (distortion cancelling) coil 50 consisting of only a few turns of fairly heavy wire, for example, five turns of No. 14 wire. Due to the fact that the impedance of the coil is low, very simple and inexpensive insulation can be employed. For instance, the wires simply may be provided with a plastic or enamel or a cotton insulating layer. The consecutive turns of the coil can be arranged to lie in immediate juxtaposition, with the insulation of each turn touching the insulation of the next turn.

The two lead wires 52, 54 extending from the coil are twisted about one another for several turns as shown in the figure, whereby to form a shank for supporting and manipulating the coil 50. This shank is caught in a clamp 56 on the chassis for the reproducing equipment, being located near the component, e. g. the A. C. power transformer P, the effect of whose stray electro-magnetic field is to be cancelled, whereby to enable the coil 50 to be placed in the immediate vicinity of such component.

The coil 50 is interposed in the lead wire 34 so that it is series connected with the reproducing coil on the ground side thereof and its output will be fed to the pre-amplifier stage 30 along with the output of the reproducing coil.

To set up the hum-bucking device, the coil 50 is connected in the pickup circuit as indicated, and the amplifying stages are energized. The operator then listens for an A. C. hum, i. e. a hum of the frequency of the stray electro-magnetic field radiated by the component adjacent which the coil 50 is disposed. This can be, and preferably is, done while the spools 12, 14 are idle. Next the operator twists the coil 50 so as to vary its orientation with respect to the power transformer P. As the coil is twisted the phase relationship of its output with respect to the voltage generated by the stray field in the reproducing coil will be shifted, and by proper manipulation these two voltages can be brought 180° out of phase. In addition, by moving the coil 50 toward and away from the source of the stray electro-magnetic field, the amplitude of the hum-bucking voltage can be varied so as to match the amplitude of the hum voltage generated in the reproducing coil. When a proper desired position of the hum-bucking coil has been obtained, the same and its twisted leads 52, 54 may be given one or more coats of any well known film-forming plastic, e. g. varnish, so that said coil will retain its proper hum-cancelling position.

It will be noticed that, because the coil 50 is at a low potential with respect to ground, it is not sensitive to hand effects. Moreover, since it is installed adjacent the component which generates the stray field, and since this component conventionally is on the chassis inside of the housing for the electrical parts of the system, the coil will not ordinarily be approached by hand. It also will be understood that this type of hum-bucking arrangement is readily adaptable to use with any type of existing equipment without a radical physical modification of such equipment. Furthermore, since the coil is at low potential it does not require any shielded leads. It will be appreciated that, inasmuch as the coil is very close to the source of the stray field and therefor operates in a relatively strong part of the field, its position is not highly critical, thus making the adjustment of said coil relatively simple.

Each stray field to be cancelled has a hum-bucking coil 50 disposed adjacent the radiating source of said field. That is to say, if in a particular piece of equipment the major offender and the only one needed to be cancelled is the power transformer, only one hum-bucking coil will be employed as indicated. If there are two sources of hum whose effects must be cancelled, two hum-bucking coils will be used, the coils being connected in series. If the effects of more stray field have to be cancelled, additional hum-bucking coils are used, these being likewise connected in series. Thus, it is extremely simple to cancel the hum from as many sources as is desired.

It is pointed out that a stray field cancellation method and means such as above described is useful in applications other than wire reproducers or audio systems in general. For example, it can be employed advantageously in applications such as television sets and cathode ray tubes where the electron beam is deflected by stray fields, such for instance as that radiated by a power transformer.

It thus will be seen that I have provided a method and means for cancelling the effects of stray fields which achieve the objects of the invention, and are well adapted to meet the conditions of practical use.

As various possible embodiments might be made in the above invention, and as various changes might be made in the embodiment above set forth, it will be understood that all matter herein described or shown in the accompanying drawing is to be interpreted as illustrative and not in a limiting sense.

Having thus described my invention I claim as new, and desire to secure by Letters Patent:

In a wire play back device including a high impedance reproducing coil, a component which radiates a stray low frequency electro-magnetic field, said reproducing coil being remote from said component and located within the range of influence of said field so that the wave forms generated thereby from the wire are distorted, a pre-amplifier stage including a vacuum tube having a cathode, an anode and a grid, a lead connecting one of the terminals of the reproducing coil to the grid of the tube, a shield for said lead, the other terminal of said reproducing coil being connected to said shield, and the cathode of said tube being grounded: a distortion cancelling coil of few turns whose impedance is low compared to that of the reproducing coil, said cancelling coil having one terminal connected to said grid and the other to ground, said cancelling coil being physically located closer to said component than to said reproducing coil and in the immediate vicinity of said component, and being so oriented and disposed with respect to said component that the voltage generated therein by said field substantially will buck in amplitude and phase the amplitude and phase of the distorting voltage generated in the reproducing coil by said field.

LEOPOLD M. KAY.

REFERENCES CITED

The following references are of record in the file of this patent:

UNITED STATES PATENTS

| Number | Name | Date |
|---|---|---|
| 2,351,005 | Camras | June 13, 1944 |
| 2,351,008 | Camras | June 13, 1944 |

FOREIGN PATENTS

| Number | Country | Date |
|---|---|---|
| 457,282 | Germany | Mar. 13, 1928 |

OTHER REFERENCES

Fiat Final Report No. 705, Figs. 11 and 12.